(12) United States Patent
Klemen et al.

(10) Patent No.: US 8,182,391 B2
(45) Date of Patent: May 22, 2012

(54) ELECTRIC TORQUE CONVERTER FOR A POWERTRAIN AND METHOD OF OPERATING A VEHICLE

(75) Inventors: Donald Klemen, Carmel, IN (US); Alan G. Holmes, Clarkston, MI (US); Brendan M. Conlon, Rochester Hills, MI (US); James D. Hendrickson, Belleville, MI (US); Norman K. Bucknor, Troy, MI (US); Michael R. Schmidt, Springfield, MO (US)

(73) Assignee: GM Global Technology Operations LLC, Detroit, MI (US)

( * ) Notice: Subject to any disclaimer, the term of this patent is extended or adjusted under 35 U.S.C. 154(b) by 1036 days.

(21) Appl. No.: 12/124,288

(22) Filed: May 21, 2008

(65) Prior Publication Data

US 2009/0288895 A1 Nov. 26, 2009

(51) Int. Cl.
*B60W 10/02* (2006.01)
*B60W 10/08* (2006.01)
*B60W 10/18* (2012.01)

(52) U.S. Cl. ............. 477/5; 477/4; 180/65.265; 701/51; 701/67

(58) Field of Classification Search .................. 477/3, 5; 475/5, 317; 701/22, 51, 67; 180/65.25, 65.275, 180/65.285
See application file for complete search history.

(56) References Cited

U.S. PATENT DOCUMENTS

| | | | |
|---|---|---|---|
| 5,558,595 A | 9/1996 | Schmidt et al. | |
| 5,789,823 A | 8/1998 | Sherman | |
| 5,931,757 A * | 8/1999 | Schmidt | 475/2 |
| 6,474,428 B1 | 11/2002 | Fujikawa et al. | |
| 6,478,705 B1 | 11/2002 | Holmes et al. | |
| 6,492,742 B1 | 12/2002 | Fujikawa et al. | |
| 6,527,658 B2 * | 3/2003 | Holmes et al. | 475/5 |
| 7,179,185 B2 * | 2/2007 | Raghavan et al. | 475/5 |
| 7,179,186 B2 * | 2/2007 | Bucknor et al. | 475/5 |
| 7,179,187 B2 * | 2/2007 | Raghavan et al. | 475/5 |
| 7,220,202 B2 * | 5/2007 | Singh et al. | 475/5 |
| 7,282,004 B2 * | 10/2007 | Raghavan et al. | 475/5 |
| 7,610,976 B2 * | 11/2009 | Holmes et al. | 180/65.29 |
| 7,963,874 B2 * | 6/2011 | Conlon | 475/5 |
| 2007/0197335 A1 * | 8/2007 | Raghavan et al. | 475/5 |
| 2007/0275806 A1 * | 11/2007 | Raghavan et al. | 475/5 |

(Continued)

OTHER PUBLICATIONS

Ozeki, Tatsuya and Umeyama, Mituhiro; Development of Toyota's Transaxle for Mini-van Hybrd Vehicles Mar. 4, 2002-Mar. 7, 2002.

*Primary Examiner* — J. Allen Shriver, II
*Assistant Examiner* — Jacob Meyer
(74) *Attorney, Agent, or Firm* — Quinn Law Group, PLLC

(57) ABSTRACT

An electric torque converter has a torque converter input member connected to the first node of a differential gear set representable by a lever diagram having first, second, and third nodes. A motor/generator is connected to the second node. The third node is connected to an input member of a transmission gearing arrangement. A brake is selectively engagable to ground the first node to a stationary member. Engagement of the brake provides a regenerative braking mode and an electric-only driving mode, with the motor/generator connected to the transmission gearing arrangement through the differential gear set. Various clutches may be provided for lock-up or selective connection of the engine, including arrangements which reduce motor/generator torque required for engine starting while in electric-only driving. A method of operating a vehicle maintains the engine speed at an optimum level to the extent possible given battery charge levels and operator commands.

19 Claims, 3 Drawing Sheets

U.S. PATENT DOCUMENTS

| | | | |
|---|---|---|---|
| 2007/0298923 A1* | 12/2007 | Raghavan | 475/5 |
| 2007/0298924 A1* | 12/2007 | Bucknor et al. | 475/5 |
| 2008/0081722 A1* | 4/2008 | Raghavan et al. | 475/5 |
| 2008/0081723 A1* | 4/2008 | Raghavan et al. | 475/5 |
| 2008/0173487 A1* | 7/2008 | Kamada et al. | 180/65.4 |
| 2008/0176696 A1* | 7/2008 | Bucknor et al. | 475/5 |
| 2008/0176697 A1* | 7/2008 | Raghavan et al. | 475/5 |
| 2008/0176704 A1* | 7/2008 | Raghavan et al. | 475/275 |
| 2008/0182710 A1* | 7/2008 | Shibata et al. | 477/3 |
| 2008/0207380 A1* | 8/2008 | Raghavan et al. | 475/275 |
| 2008/0248909 A1* | 10/2008 | Raghavan et al. | 475/5 |
| 2009/0017984 A1* | 1/2009 | Shibata et al. | 477/3 |
| 2009/0023548 A1* | 1/2009 | Imamura et al. | 477/3 |
| 2009/0093332 A1* | 4/2009 | Bucknor et al. | 475/5 |
| 2010/0041511 A1* | 2/2010 | Tabata et al. | 477/3 |
| 2010/0227735 A1* | 9/2010 | Sah et al. | 477/5 |

* cited by examiner

| | C1 | C2 | B1 |
|---|---|---|---|
| Key-on ("cold") start | ON | OFF | ON |
| Torque Converter | OFF | ON | OFF |
| Parallel Hybrid (Direct) | ON | ON | OFF |
| Parallel Hybrid (Geared) | ON | OFF | ON |
| Regenerative Braking | OFF | OFF | ON |
| Electric-Only Driving | OFF | OFF | ON |

ELECTRIC TORQUE CONVERTER FOR A POWERTRAIN AND METHOD OF OPERATING A VEHICLE

TECHNICAL FIELD

The invention relates to a powertrain having an electric torque converter as well as to a method of operating a vehicle.

BACKGROUND OF THE INVENTION

Powertrains having an automatic transmission often utilize a hydraulic torque converter connected between an internal combustion engine and a gearing arrangement with selectable fixed ratios. The torque converter is a fluid coupling that reduces speed and multiplies torque, thus increasing the overall speed ratio of the transmission. The torque converter allows the engine to spin somewhat independently of the transmission, thus partially decoupling the engine from the transmission, and allowing the engine to turn when the car is idling without requiring great braking force on the transmission.

Hybrid electrically variable powertrains include an engine and a transmission that receives power flow from the engine and from one or more motor/generators. Hybrid electrically variable transmissions have a differential gear set, with power from the engine and power from the motor/generator flowing through different members of the differential gear set. Hybrid electrically variable transmissions may include torque-transmitting mechanisms controllable in various engagement schemes to offer a combination of operating modes, including both electrically variable ranges and fixed gear ratios. The electrically variable ranges typically provide smooth operation while the fixed gear ratios provide maximum torque performance and maximum fuel economy under certain conditions such as continuous highway cruising. The electrically variable range is established via an electromechanical power path, wherein a fraction of the power transmitted from the engine to the output is converted into electricity by one motor/generator then back into mechanical power by another motor/generator. Fixed gear ratios typically provide excellent transmission output torque and vehicle acceleration by coupling the motor/generators and the engine directly together. In a fixed gear ratio, the power flow path from the transmission input member to the transmission output member is considered to be entirely through a mechanical power path, as speed is not varied by the motor/generator.

SUMMARY OF THE INVENTION

An electric torque converter adapted for connection between an engine and a transmission gearing arrangement can be thought of as a replacement for a hydraulic torque converter that enables hybrid vehicle operating modes. The electric torque converter is an arrangement of electric and mechanical components, rather than a hydraulic torque converter. Specifically, the electric torque converter is part of a powertrain that also includes the engine and the transmission gearing arrangement. The electric torque converter has a torque converter input member for receiving power from or providing power to the engine. The electric torque converter also includes a differential gear set that is representable by a lever diagram having first, second, and third nodes, with the torque converter input member connected to the first node. The electric torque converter includes a motor/generator that is connected to the second node. A battery provides power to or receives power from the motor/generator. The third node is connected to an input member of the transmission gearing arrangement. A brake is selectively engagable to ground the first node to a stationary member. Engagement of the brake provides a regenerative braking mode and an electric-only driving mode, with the motor/generator connected to the transmission gearing arrangement through the differential gear set.

Preferably, a first clutch is provided to connect the engine with one of the other nodes. If the electric torque converter input member is continuously connected to first node, then engagement of the first clutch locks up the differential gear set such that all elements rotate at the same speed in a hybrid operating mode. However, in some embodiments, the electric torque converter input member is not continuously connected to the first node, in which case a second clutch is provided to selectively engage the torque converter input member and the first node. An engagement schedule for the brake and the first clutch (and the second clutch, if provided in the specific embodiment) allow cold starting of the engine using the motor/generator, a "torque converter" mode in which torque and rotational speed from both the motor/generator and the engine are combined through the differential gear set, as well as parallel hybrid modes in which torque from both the motor/generator and the engine are combined in common rotation. A powertrain having the electric torque converter may have lower assembly and component costs than hybrid electrically variable powertrains offering similar mode capabilities, as they typically require two motor/generators. Other hybrid powertrains with only one motor/generator typically are limited to direct parallel hybrid operation and electric-only modes.

A vehicle having the electric torque converter described above may be operated according to a method that includes propelling the vehicle using the motor/generator powered by the battery, without starting the engine. While the vehicle is propelled in this manner, the level of charge and rate of discharge of the battery is at least periodically monitored. The engine is started either if the operator commands require a greater amount of power than is available from the battery (according to the monitored level and/or rate of discharge) or if it is determined that the battery has reached a predetermined minimum level of charge at which it is desirable to recharge the battery. After the engine is started, the operation of the engine and the motor/generator are varied in order to meet operator commanded vehicle power requirements while maintaining the engine at a predetermined optimum speed, unless it must be operated at a different speed level so that the engine can recharge the battery up to a level of charge greater than the minimum level, referred to as a maximum level of recharge herein, but which need not be the maximum charge level that the battery can hold. If the operator commands then require an amount of power that is available from the battery or when the battery reaches the predetermined recharge level, the engine is stopped. The above steps are continuously repeated until the vehicle is stopped (i.e., not just temporarily stopped at a traffic light, but when it is no longer being used by the operator for transport). At that point, the battery may be connected with an outside source of electricity and recharged.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

First Embodiment

Figure 1:
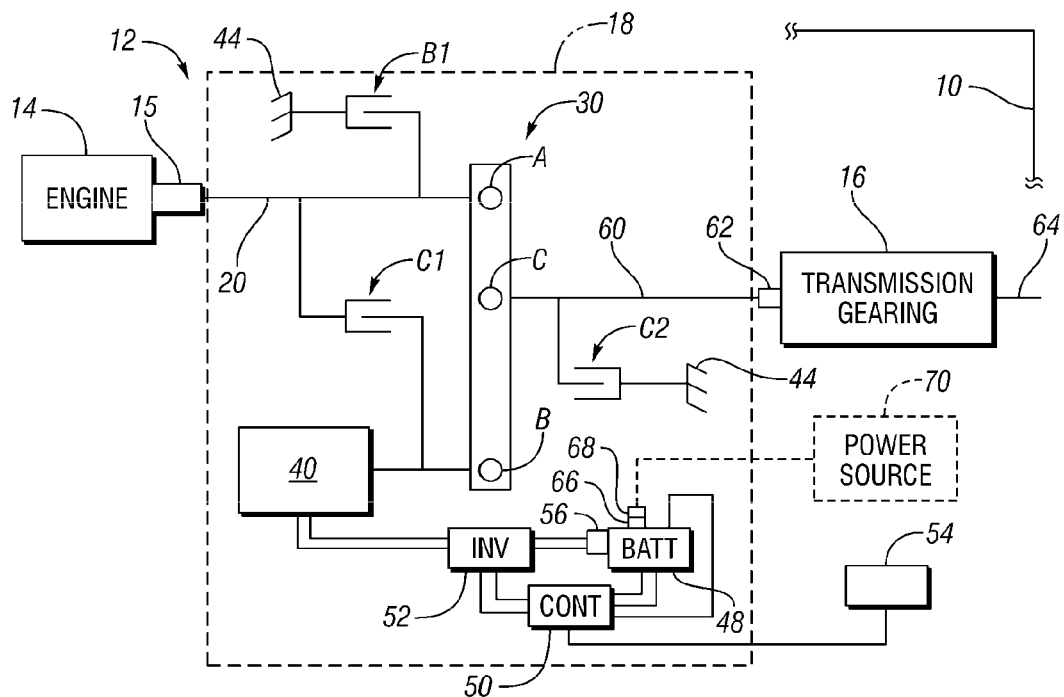
FIG. 1 is a schematic illustration of a first embodiment of a vehicle having a powertrain with an electric torque converter showing a differential gear set of the electric torque converter in lever diagram form and showing optional recharging using an outside electric source.

Referring to the drawings, wherein like reference numbers refer to like components, one representative form of a powertrain utilizing an electric torque converter is depicted in FIG. 1. A vehicle 10 (shown schematically) utilizes a powertrain 12 having an engine 14, a transmission gearing arrangement 16, and an electric torque converter 18 connected therebetween. The electric torque converter 18 may be a replacement for a hydraulic torque converter, as it is located in a similar position between the engine 14 and the transmission gearing arrangement 16. The electric torque converter 18 includes the arrangement of electrical and mechanical components within the dashed lines referred to by the reference number 18. An engine output member 15 directly drives an electric torque converter input member 20, which may be in the nature of a shaft. In the embodiment depicted, the engine 14 may be a diesel engine or other internal combustion engine.

In addition to the torque converter input member 20, the electric torque converter 18 includes a differential gear set 30 represented in lever diagram form having a first node A, a second node B and a third node C. Those skilled will readily recognize that certain components of a differential gear set can be represented by a node on a lever diagram. For instance, in a planetary gear set, a carrier member, a sun gear member and a ring gear member are all represented as nodes on a lever diagram, but pinion gears supported by the carrier member are not represented as nodes. Also, in a compound planetary gear set, those gear elements that are continuously interconnected with one another for common rotation about the central axis are represented by a single node. Those skilled in the art readily understand the representation of differential gear sets as lever diagrams. Preferably, the differential gear set 30 is a planetary gear set with a sun gear member represented by node B, a planet carrier member represented by node C, and a ring gear member represented by node A, with the planet carrier member rotatably supporting a set of pinion gears (not shown in the lever diagram) that intermesh with both the sun gear member of node B and the ring gear member of node A. Alternately, the differential gear set 30 might be a single planetary gear set with inner and outer sets of pinion gears, with a planet carrier member A, a sun gear member B, and a ring gear member C.

The electric torque converter input member 20 is connected to node A. The electric torque converter 18 also includes a motor/generator 40. As will be well understood by those skilled in the art, the motor/generator 40 includes a rotor portion as well as a stator portion grounded to a stationary member, such as a housing of the electric torque converter 18. The rotor portion is connected for rotation with node B. The stator portion may receive electrical power from or provide electrical power to an energy storage device 48 such as a battery.

An electronic controller 50 is in signal communication with the battery 48 and with a power inverter 52 that is also in electrical communication with the motor/generator 40. The inverter 52 converts between direct current provided or utilized by the battery 48 and alternating current provided or utilized by the motor/generator 40. The controller 50 responds to a variety of input signals including vehicle speed, operator commands, the level at which the battery 48 is charged and the rate of discharge of the battery 48, as well as the power being provided by the engine 14 to regulate the flow of power between the motor/generator 40 and the battery 48 via the inverter 52. Operator commands are sent to the controller 50 from an operator input mechanism 54, such as an accelerator or a brake pedal. The level of charge and rate of discharge of the battery 48 are determined by the controller 50 based on current flowing from the battery 48 as measured by one or more sensors 56. The controller 50 monitors the information from the sensor(s) 56 and the operator input mechanism 54 to control the operation of the motor/generator 40, of the engine 14 as well as of various torque transmitting mechanisms as discussed below.

Node C is connected for common rotation with an electric torque converter output member 60 that is in turn connected for common rotation with an input member 62 of the transmission gearing arrangement 16. Preferably, the transmission gearing arrangement 16 is a fixed ratio gearing arrangement, such as one or more planetary gear sets or a set of intermeshing gears and transfer shafts, which can transfer shaft power at a fixed ratio or several selectable fixed ratios, culminating in a transmission output member 64. The transmission output member 64, which may also be in the nature of a shaft, is operatively connected to vehicle wheels (not shown) such that the powertrain 12 can drive the wheels.

The electric torque converter 18 includes the following torque-transmitting mechanisms: brake B1 and clutches C1 and C2. Brake B1 is selectively engagable to ground node A, the electric torque converter input member 20 and the engine output member 15 to a stationary member 44 such as the transmission housing. Thus, brake B1 acts as an engine brake. Brake B1 may be a one-way (i.e., freewheeling or overrunning) clutch or it might be a controllable one-way clutch or the combination of a one-way clutch in parallel with a disc brake or band brake. When engaged, brake B1 holds the electric torque converter input member 20 stationary to provide reaction torque for passing power through the differential gear set 30) from the motor/generator 40 to the transmission input member 62 and/or from the transmission input member 62 to the motor/generator 40 for regenerative braking.

Clutch C1 is selectively engagable to connect node A, the electric torque converter input member 20 and the engine output member 15 to node B. Because clutch C1 connects node A for common rotation with node B, it causes all of nodes A, B and C as well as the motor/generator 40, the electric torque converter input member 20 and the engine output member 15 to rotate at a common speed. An alternate preferred location for C1 is between nodes A and C (when these nodes represent a ring gear member and a carrier member), to relieve torque load on the pinion gears when the clutch C1 is engaged. Clutch C1 could be closed (i.e., applied or engaged) by a spring, and opened (disengaged) by hydraulic pressure.

Clutch C2 is selectively engagable to connect node C, the electric torque converter output member 60 and the transmission gearing input member 62 to the stationary member 44. Clutch C2 could alternately be placed outside of the electric torque converter 18 to connect the transmission input member 62 to a stationary member such as the transmission casing, and would have the same effect on node C. Clutch C2 could be an electrically or hydraulically-engaged clutch, a pawl mechanism, or a switchable one-way clutch.

The clutches C1 and C2 as well as the brake B1 are in signal communication with the controller 50 via transfer conductors (not shown for simplicity). The controller 50 controls engagement of clutches C1 and C2 and brake B1 to enable various operating modes for the powertrain 12. As used herein, a "mode" is a particular operating state, whether encompassing a continuous range of speed ratios or only a fixed speed ratio, achieved by engagement of a particular torque-transmitting mechanism or torque-transmitting mechanisms.

Operation and control of the electric torque converter 18 may include propulsion using the motor/generator 40 only, regenerative braking, engine starting, engine restarting, engine stopping, simple parallel operation, and power-split operation. The vehicle 10 can be propelled electrically by the motor/generator 40 alone, with the engine 14 stationary, by engaging brake B1. Clutches C1 and C2 would be disengaged. Mechanical power would flow from the motor/generator 40 through node B (the sun gear member) to node C (the carrier member) and out to the transmission gearing arrangement 16 and the output member 64. The torque from the motor/generator 40 alone would be multiplied, using backward, reaction torque from the node A (the ring gear member) and brake B1. The motor/generator 40 would spin forward at a relatively high speed. If the brake B1 is designed to support forward reaction torque, then regenerative braking of the vehicle 10 would reverse this process.

The engine 14 could be started in a cold start (i.e., when the vehicle 10 is stationary) by the motor/generator 40, by engaging clutch C1, with the brake B1 disengaged. The motor/generator 40 and the engine 14 would rotate together using power provided by the battery 48 until the engine 14 starts.

Alternatively, clutch C2 can be engaged to lock node C (the carrier member) during a cold start of the engine 14, with clutch C1 and brake B1 disengaged, power from the motor/generator 40 flowing through the differential gear set represented by lever 30 to start the engine 14. By utilizing the torque multiplication provided from node B to node A of the lever 30, motor torque requirement would be reduced from 100% of engine starting torque to approximately 40% of engine starting torque, which would substantially reduce the required battery power of battery 48 and permit the use of a relatively low cost, compact motor/generator 40.

During a restart with the transmission input member 62 rotating (i.e., a start of the engine 14 when the vehicle 10 is not stationary), clutch C1 would at first be disengaged, then applied gradually, slipping to allow the speed of the engine 14 to increase and the speed of the motor/generator 40 to decrease, converging to the speed of the transmission input member 62. With the clutch C1 then locked, the engine 14 and motor/generator 40 could together propel the vehicle 10 in simple parallel hybrid operation, and the motor/generator 40 could provide regenerative braking, as described below.

A power-split operating mode is provided by disengaging clutch C1 with brake B1 disengaged and the engine 14 connected to node A, thus allowing the motor/generator 40 to be controlled at a desired speed to adjust the speed ratio between the engine 14 and the transmission input member 62. This requires a power split, with the motor/generator 40 providing power (via the battery 48) or absorbing power to adjust the ratio while power is also transmitted to or from the engine 14. This power-split operation is similar to hydraulic torque converter operation, except that power is recovered and can be added, rather than dissipated. Power-split operation allows smooth vehicle launch using the engine 14 to propel the vehicle 10. Clutch C1 can be slipped for a strong but relatively harsh vehicle launch from zero speed using the maximum of the sum of engine torque and motor/generator torque.

Simple parallel operation and power-split operation of the electric torque converter 18 may be combined to determine the speed ratio from the engine 14 to the wheels (i.e., the ratio from the electric torque converter input member 20 to the transmission gearing arrangement output member 64). Smooth transitions from the power-split mode to simple parallel operation can be achieved by gradually adjusting the speed ratio between the engine 14 and the transmission input member 62 by adjusting the speed of the motor/generator 40. At the point that the speed of the motor/generator 40 is zero, the speed of the engine 14 (and engine output shaft 15) will be a predetermined ratio of the speed of the transmission input member 62. Transmission input speed relative to engine speed can be increased beyond this predetermined value by applying battery power to the motor/generator 40 so that its angular speed is in the same direction of the engine speed. At the point where the motor/generator 40 (i.e., the rotor portion thereof), the engine output shaft 15 and the transmission gearing arrangement input member 62 are all rotating at the same speed, clutch C1 can be locked seamlessly thereby achieving a "cold shift". If the operator requests acceleration at a level that requires a downshift (as determined by the controller 50 via a signal from the operator input mechanism 54), the torque on the motor/generator 40 may be increased, reducing the torque carried by the clutch C1 to zero. At that point, Clutch C1 may be seamlessly disengaged, allowing the engine 14 to accelerate above the speed of the motor/generator 40. This has two advantages. First, it decouples the inertia of the motor/generator 40 from the inertia of the engine 14 (i.e., inertia of a flywheel portion of the engine 14), which improves vehicle responsiveness, acceleration performance, and reduces energy dissipated in the transmission gearing arrangement 16 during upshifts. Second, it allows the motor/generator 40 to maintain a speed near its power peak while the motor/generator 40 supplies positive power from the battery 48 to help propel the vehicle 10.

A regenerative braking mode is established either with C1 engaged, using the transmission gearing arrangement 16 to downshift through the fixed ratios available as the vehicle decelerates, or with the engine 14 braked by engagement of the brake B1, and the transmission gearing arrangement 16 held in a relatively high gear ratio such as a 1:1 ratio. The second option has the advantages of eliminating the need for transmission downshifts at low vehicle speeds where regenerative torque is high, eliminating engine losses, reducing transmission spin and mesh losses, and providing a gear ratio between motor/generator 40 and the transmission gearing arrangement input member 62, which improves motor efficiency.

The battery 48 is equipped with a receptacle 66 adapted to receive a plug 68 that is connected via wire to outside power source 70. An "outside power source" is one that is not part of the vehicle 10, and is used for plug-in recharging of the battery 48.

Second Embodiment

Figure 2:
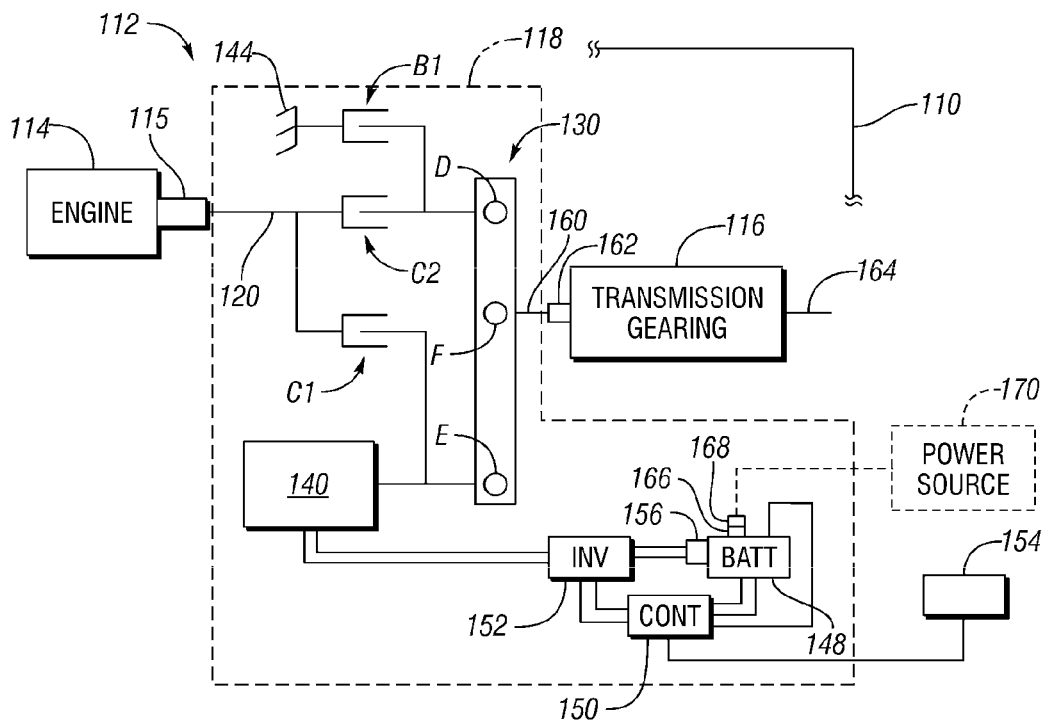
FIG. 2 is a schematic illustration of a second embodiment of a vehicle having a powertrain with an electric torque converter showing a differential gear set of the electric torque converter in lever diagram form and showing optional recharging using an outside electric source.

Another representative form of a powertrain utilizing an electric torque converter is depicted in FIG. 2. A vehicle 110 (shown schematically) utilizes a powertrain 112 having an engine 114, a transmission gearing arrangement 116, and an electric torque converter 118 (including all of the components within the dashed lines 118) connected therebetween. An engine output member 115 directly drives an electric torque converter input member 120, which may be in the nature of a shaft. In the embodiment depicted, the engine 114 may be a diesel engine or other internal combustion engine.

In addition to the torque converter input member 120, the electric torque converter 118 include a differential gear set 130 represented in lever diagram form having a first node D, a second node E and a third node F. Preferably, the differential gear set 130 is a planetary gear set with a sun gear member represented by node E, a planet carrier member represented by node F, and a ring gear member represented by node D, with the planet carrier member rotatably supporting a set of pinion gears (not shown in the lever diagram) that intermesh with both the sun gear member of node E and the ring gear member of node D.

The electric torque converter input member 120 may be connected to node D by engagement of a clutch C2, discussed below. The electric torque converter 118 also includes a motor/generator 140. As will be well understood by those skilled in the art, the motor/generator 140 includes a rotor portion as well as a stator portion grounded to a stationary member, such as a housing of the electric torque converter 118. The rotor portion is connected for rotation with node E. The stator portion may receive electrical power from or provide electrical power to an energy storage device 148 such as a battery.

An electronic controller 150 is in signal communication with the battery 148 and with a power inverter 152 that is also in electrical communication with the motor/generator 140. The inverter 152 converts between direct current provided or utilized by the battery 148 and alternating current provided or utilized by the motor/generator 140. The controller 150 responds to a variety of input signals including vehicle speed, operator commands, the level at which the battery 148 is charged and the rate of discharge of the battery 148, as well as the power being provided by the engine 114 to regulate the flow of power between the motor/generator 140 and the battery 148 via the inverter 152. Operator commands are sent to the controller 150 from an operator input mechanism 154, such as an accelerator or a brake pedal. The level of charge and rate of discharge of the battery 148 are determined by the controller 150 based on current flowing from the battery 148 as measured by one or more sensors 156. The controller 150 monitors the information from the sensor(s) 156 and the operator input mechanism 154 to control the operation of the motor/generator 140, the engine 114 as well as various torque transmitting mechanisms, as discussed below. The battery 148 is equipped with a receptacle 166 adapted to receive a plug 168 that is connected via wire to outside power source 170.

Node F is connected for common rotation with an electric torque converter output member 160 that is in turn connected for common rotation with an input member 162 of the transmission gearing arrangement 116. Preferably, the transmission gearing arrangement 116 is a fixed ratio gearing arrangement, such as one or more planetary gear sets or a set of intermeshing gears and transfer shafts, which can transfer shaft power at a fixed ratio or several selectable fixed ratios, culminating in a transmission output member 164. The transmission output member 164, which may also be in the nature of a shaft, is operatively connected to vehicle wheels (not shown) such that the powertrain 112 can drive the wheels.

The electric torque converter 118 includes the following torque-transmitting mechanisms: brake B1 and clutches C1 and C2. Brake B1 is selectively engagable to ground node D to a stationary member 144 such as the transmission housing. Brake B1 may be a one-way (i.e., freewheeling or overrunning) clutch or it might be a controllable one-way clutch or the combination of a one-way clutch in parallel with a disc brake or band brake. Clutch C1 is selectively engagable to connect node E to the electric torque converter input member 120 and the engine output member 115. Clutch C2 is selectively engagable to connect node D with the electric torque converter input member 120 and the engine output member 115.

Figures 3, 4:
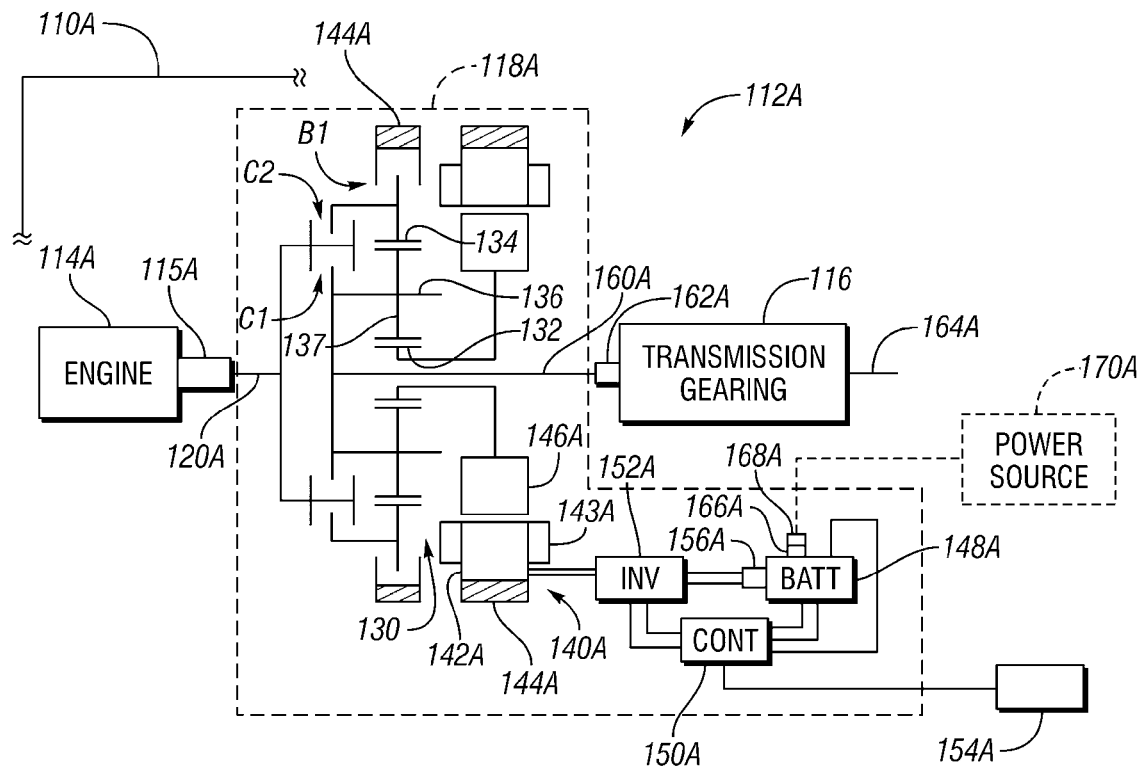
FIG. 3 is a schematic illustration of the vehicle, powertrain and outside electric source of FIG. 2, with the differential gear set shown in stick diagram form.
FIG. 4 is a table showing the engagement schedule of torque-transmitting mechanisms included in the electric torque converter of FIGS. 2 and 3.

FIG. 3 shows the embodiment of FIG. 2 in stick diagram, rather than lever form, with one possible representation of the lever diagram 130 as a simple planetary gear set 130A having a ring gear member 134 as node D, a sun gear member 132 as node E, and a carrier member 136 as node F. The vehicle with this implementation of the lever 130 is referred to as vehicle 110A, having powertrain 112A with electric torque converter 118A. The carrier member 136 rotatably supports a plurality of pinion gears 137 that intermesh with both the sun gear member 132 and the ring gear member 134. The remaining components are interconnected and function the same as those shown with corresponding reference numbers in the lever diagram format of the powertrain 112 of FIG. 2, and are numbered similarly with an "A" added to specify that these components are used with the specific simple planetary gear set 130A implementation of lever diagram 130. For example, an output shaft 115A of engine 114A is connected with torque converter input member 120A. Torque converter input member 120A is selectively connectable to carrier member 136 by engagement if clutch C1, and is selectively connectable to ring gear member 134 by engagement of clutch C2. Ring gear member 134 is selectively grounded to stationary member 144A by engagement of brake B1.

The carrier member 136 is connected for common rotation with an electric torque converter output member 160A that is in turn connected for common rotation with an input member 162A of a transmission gearing arrangement 116A. Preferably, the transmission gearing arrangement 116A is a fixed ratio gearing arrangement, such as one or more planetary gear sets or a set of intermeshing gears and transfer shafts, which can transfer shaft power at a fixed ratio or several selectable fixed ratios, culminating in a transmission output member 164A.

Motor/generator 140A includes a stator portion 142A grounded to the stationary member 144A. Electrical windings 143A are supported by the stator portion 142A and create a magnetic force to move the rotor portion 146A (or electrical current is established in the windings 143A by movement of the rotor portion 146A, as will be understood by those skilled in the art). Similar windings exist on the stator of the motor/generator 40 of FIG. 1 and the stator of the motor/generator 140 of FIG. 2, but are not shown for purposes of clarity in the schematic illustrations. The rotor portion 146A is connected with the sun gear member 132.

An electronic controller 150A is in signal communication with a battery 148A, with an operator input mechanism 154A, and with a power inverter 152A that is also in electrical communication with the stator portion 142A. These components function in the same manner as the similarly numbered components of FIG. 2. The level of charge and rate of discharge of the battery 148A are determined by the controller 150A based on current flowing from the battery 148A as measured by one or more sensors 156A. The controller 150A monitors the information from the sensor(s) 156A and the operator input mechanism 154A to control the operation of the motor/generator 140A, the engine 114A as well as various torque transmitting mechanisms, as discussed below. The battery 148A is equipped with a receptacle 166A adapted to receive a plug 168A that is connected via wire to outside power source 170A.

The engagement schedule by which brake B1 and clutches C1 and C2 are engaged to result in six different operating modes are shown in the engagement schedule of FIG. 4. First, a key-on "cold" start (i.e., a start of the engine 114A from a cold state) occurs by engagement of clutch C1 and brake B1. With the stationary member 144A providing a reaction force, the motor/generator 140A turns both the engine 114A and the transmission gearing arrangement 116A, with the transmission gearing arrangement 116A set in neutral or park so that the vehicle 110A does not move.

By disengaging C1 and B1 and engaging C2, the engine 114A can now turn the ring gear member 134. The motor/generator 140A turns the sun gear member 132. The sum of the torque on the sun gear member 132 and the ring gear member 134 is combined through the carrier member 136 to the transmission gearing arrangement 116A and out to the vehicle wheels via the transmission output member 164A.

A parallel hybrid direct operating mode is provided by engaging both clutches C1 and C2 with brake B1 disengaged. In this mode, torque from the engine 114A and from the motor/generator 140A (as powered by battery 148A) is supplied to the transmission gearing arrangement 116A. Because the engagement of both clutches C1 and C2 lock all components of the planetary gear set 130A for rotation at the same speed, the engine 114A and motor/generator 140A also rotate at the same speed.

A parallel hybrid direct operating mode, which still uses torque from both the engine 114A and the motor/generator 140A to turn the transmission gearing arrangement 116A but allows the motor/generator 140A to use the torque multiplication available from the planetary gear set 130A, is available when clutch C1 and brake B1 are engaged with clutch C2 disengaged.

If braking occurs during the parallel hybrid geared operating mode, regenerative braking mode is established by disengaging clutch C1 while brake B1 remains engaged so that slowing of the wheels is accomplished by operating the motor/generator 140A as a generator to recapture rotational energy (i.e., rotation of sun gear member 132) as stored energy in the battery 148A. Alternatively, the same engagement schedule (Brake B1 engaged and clutches C1 and C2 disengaged allows electric only driving, with the engine 114A disconnected from the wheels and the motor/generator 140A powering the vehicle 110A using stored energy from the battery 148A and the torque multiplication available from the planetary gear set 130A. If additional acceleration is required in the electric-only driving mode, the engine 114A may be restarted by engaging clutch C1 to restart the engine 114A and allow it to also power the vehicle 110A.

The embodiments of FIGS. 2 and 3 each have the advantage that starting the engine 114, 114A by slipping engagement of clutch C1 with clutch C2 disengaged requires from the motor/generator 140, 140A only the additional torque necessary to start the engine, rather than the sum of engine starting torque and the torque being supplied by the brake B1. Once the engine has started, then clutch C1 can be fully disengaged, C2 can be engaged, and B1 can be disengaged. This sequence can change the operation of the electric torque converter from electric-only operation to torque converter operation with a progressively lower requirement for torque from the motor/generator 140, 140A in the electric torque converter arrangements 118 and 118A.

Figure 5:
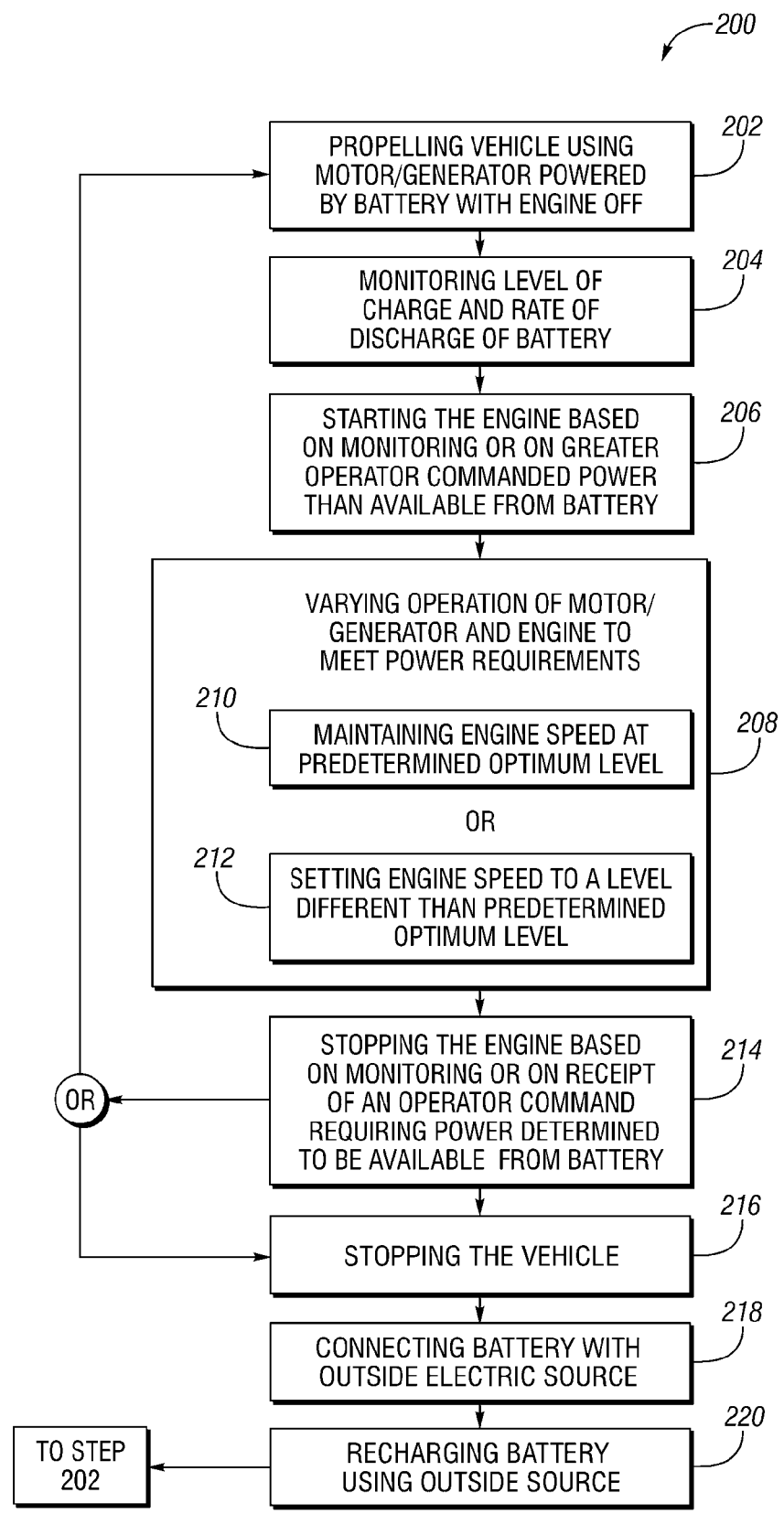
FIG. 5 is a flow chart illustrating a method of operating a vehicle.

Referring now to FIG. 5, a flow chart illustrating the steps of a method of operating a vehicle 200 will be described with respect to the vehicle 110A of FIG. 3, although the method may be applied to all of the embodiments having the electric torque converter components described herein. The method 200 is carried out according to an algorithm stored in the controller 150A of FIG. 3 and is designed to most efficiently use the power sources on a vehicle (i.e., the engine and the motor/generator) in view of the fact that an engine most efficiently combusts fuels at a given optimum speed and that the power available to power the motor/generator is limited by what is stored in the battery.

Accordingly, referring to FIG. 5, the method 200 includes step 202, propelling the vehicle 110A using the motor/generator 140A powered by the battery 148A with the engine 114A off (i.e., the electric-only driving mode described above and shown in the engagement schedule of FIG. 4).

During step 202, step 204 occurs, monitoring the level of charge and rate of discharge of the battery 148A (i.e., using the sensor(s) 156A and the controller 150A, as described above. In the monitoring step 204, sensed feedback is provided to the controller 150A on a periodic basis. Preferably, both the level of charge and rate of discharge are monitored, but only one of these may be monitored within the scope of the invention as well. as described above. In the monitoring step 204, sensed feedback is provided to the controller 150A on a periodic basis. Preferably, both the level of charge and rate of discharge are monitored, but only one of theses may be monitored within the scope of the invention as well.

Step 206 may then occur, starting the engine 114A, based either on the controller 150A determining from the level of charge monitored in monitoring step 204 that the battery 148A has reached a predetermined minimum level of charge at which it is desirable to recharge the battery 148A, or upon the controller 150A receiving an operator input command from the operator input mechanism 154A that the controller 150A determines will require more power than is available from the battery 148A based on the monitored level of charge or rate of discharge, as determined in step 204.

After the engine is started in step 206, the operation of the motor/generator 140A and the engine 114A are varied by the controller 150A in step 208 in order to meet operator commanded vehicle power requirements, as provided to the controller 150A by the operator input mechanism 154A. Step 208 includes two possible substeps, steps 210 and step 212. First, if the monitored level of charge of the battery 148A is greater than the predetermined minimum level, then the motor/generator 140A may be used to supply torque and the engine speed may be maintained under step 210 at the optimum speed. Alternatively, if the monitored level of battery charge is not greater than the predetermined minimum level, then under step 212 engine speed is set to a level different than the predetermined level in order to meet operator commanded vehicle power requirements while the motor/generator 140A is controlled to function as a generator to recharge the battery 148A.

If during the varying step 208, the level of charge of the battery 148 is sufficient to meet operator commanded operating requirements, either because the specific operator commands now require a lesser amount of power or because the battery 148A has been recharged under step 212 to a maximum recharge level, under step 214, the engine 114A is stopped, and the vehicle 110A is powered only by the motor/generator 140A (using power stored in the battery 148A).

Steps 202, 204, 206 and 208 are continuously repeated unless the vehicle is stopped under step 216. Then, if desired, the battery 148A may be connected with an outside electric source under step 218 and recharged using the outside electric source under step 220. When the vehicle 110A is to be used again (for propulsion), the method 200 returns to step 202, and is repeated as described above.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
    an engine;
    a transmission gearing arrangement having a transmission gearing arrangement input member and an output member;
    a stationary member;
    an electric torque converter having:
        a torque converter input member for receiving power from or providing power to the engine;
        a differential gear set having at least three members including a first member, a second member and a third member; wherein the torque converter input member is connectable to said first member;
        a motor/generator connected to said second member;
        a battery for providing power to or receiving power from said motor/generator;
        wherein said third member is operatively connected to the transmission gearing arrangement input member; and
    a brake selectively engagable for grounding said first member to the stationary member; wherein selective engagement of said brake provides a regenerative braking mode when said motor/generator is controlled to operate as a generator and provides an electric-only driving mode when said motor/generator is controlled to operate as a motor.

2. The powertrain of claim 1, wherein said electric torque converter has a clutch selectively engagable to connect the torque converter input member for common rotation with one of said second and third member.

3. The powertrain of claim 2, wherein selective engagement of said clutch also connects said first member and said third member for common rotation, thereby causing the first, second, and third members, said torque converter input member and said transmission gearing arrangement input member to rotate at a common speed in a hybrid operating mode.

4. The powertrain of claim 1, wherein selective engagement of said brake also grounds said engine to said stationary member.

5. The powertrain of claim 1, wherein said electric torque converter has:
    a first clutch selectively engagable to connect the torque converter input member for common rotation with said third member;
    a second clutch selectively engagable to connect said torque converter input member for common rotation with said first member; and
    wherein engagement of said first clutch and said brake with said second clutch disengaged causes said motor/generator to turn both said torque converter input member and said transmission gearing arrangement input member, thereby starting said engine and causing said powertrain to operate in a parallel hybrid mode with torque multiplication via said differential gear set once said engine has started.

6. The powertrain of claim 1, wherein said electric torque converter has:
    a second clutch selectively engagable to connect said torque converter input member for common rotation with said first member; and
    wherein engagement of said second clutch causes torque from said engine and torque from said motor/generator to be combined at said transmission gearing arrangement input member.

7. The powertrain of claim 1, wherein said electric torque converter has:
    a first clutch selectively engagable to connect said torque converter input member for common rotation with said third member;
    a second clutch selectively engagable to connect said torque converter input member for common rotation with said first member; and
    wherein engagement of both said first and second clutches causes torque from said engine and torque from said motor/generator to be combined at said transmission gearing arrangement input member, with said engine, said motor/generator and said transmission gearing arrangement input member rotating at a common speed, in a parallel hybrid direct operating mode.

8. The powertrain of claim 1, wherein said electric torque converter has:
    a first clutch selectively engagable to connect said torque converter input member for common rotation with said third member; and
    wherein selective engagement of said first clutch when said brake is engaged during said electric-only driving mode causes said motor/generator to turn said torque converter input member, thereby starting said engine.

9. The powertrain of claim 1, wherein said electric torque converter has:
    a first clutch selectively engagable to connect said torque converter input member for common rotation with said third member; and
    wherein selective engagement of said first clutch when said brake is disengaged during said electric-only driving mode causes said motor/generator to turn said torque converter input member, thereby starting said engine.

10. The powertrain of claim 1, wherein said electric torque converter has:
    a first clutch selectively engagable to connect said torque converter input member for common rotation with said third member; and
    wherein selective engagement of said first clutch when said brake is disengaged and said engine and said output member are stopped and powering of said motor/generator causes said motor/generator to turn said torque converter input member, thereby starting said engine.

11. The powertrain of claim 1, wherein said electric torque converter has:
    a first clutch selectively engagable to connect said torque converter input member for common rotation with said third member; and
    wherein selective engagement of said first clutch when said brake is disengaged and said engine and said output member are stopped and powering of said engine while varying speed of said motor/generator causes said engine to turn said torque converter input member, thereby starting said engine, while said motor/generator adds torque to or removes torque from said transmission gearing arrangement input member.

12. The powertrain of claim 2, wherein releasing said clutch during said hybrid operating mode permits control of said motor/generator as a generator with regenerative braking torque applied thereto.

13. The powertrain of claim 1, wherein said clutch is a spring applied clutch which is held in a normally engaged state by a spring and is disengaged via hydraulic pressure so that the motor/generator is connected to the engine via the clutch for starting the engine without requiring a buildup of hydraulic pressure.

14. The powertrain of claim 1, wherein the transmission gearing arrangement has multiple transmission clutches selectively engagable to establish different fixed gear ratios between said transmission gearing arrangement input member and said output member; and wherein said motor/generator is controlled to vary in speed during at least some of said different fixed gear ratios when said brake and said first clutch are disengaged.

15. The powertrain of claim 1, wherein the first member is a ring gear member, the second member is a sun gear member, and the third member is a carrier member.

16. An arrangement of electrical and mechanical components adapted for connection between an engine and a fixed ratio transmission gearing arrangement in a vehicle powertrain, comprising:

an input member adapted for receiving power from or providing power to the engine;

an output member adapted for providing power to or receiving power from the transmission gearing arrangement;

a differential gear set having at least three members including a first member, a second member and a third member; wherein said input member is connectable to said first member;

a motor/generator connected to said second member;

a battery for providing power to or receiving power from the motor/generator;

wherein said third member is adapted for connection to the fixed ratio transmission gearing arrangement;

a brake adapted for selectively grounding said first member to a stationary member for reducing speed and increasing torque from said second to third member; and wherein the arrangement is configured to provide power-split operation, electric-only launch, and electric-only drive to the fixed ratio transmission gearing arrangement when connected between the engine and the fixed ratio transmission gearing arrangement.

17. The arrangement of claim 16, further comprising:

a first clutch selectively engagable to connect said input member and said output member;

a second clutch selectively engageable to connect said input member for common rotation with said first member;

wherein said first clutch is configured to carry starting torque from said output member to said engine when engaged; and wherein said brake is engaged and said second clutch is disengaged during engine starting.

18. The arrangement of claim 17, wherein said selective engagement of said first clutch and said brake provides for engine starting while said vehicle is in electric-only drive operation using power provided by said battery.

19. The arrangement of claim 16, wherein the first member is a ring gear member, the second member is a sun gear member, and the third member is a carrier member.

* * * * *